US012149525B2

(12) United States Patent
Finger et al.

(10) Patent No.: US 12,149,525 B2
(45) Date of Patent: Nov. 19, 2024

(54) HOLISTIC MODULE AUTHENTICATION WITH A DEVICE

(71) Applicant: T-Mobile USA, Inc., Bellevue, WA (US)

(72) Inventors: Joshua Finger, Covington, WA (US); Gina Tran, Seattle, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 537 days.

(21) Appl. No.: 16/240,129

(22) Filed: Jan. 4, 2019

(65) Prior Publication Data

US 2020/0220865 A1    Jul. 9, 2020

(51) Int. Cl.
*H04L 9/40* (2022.01)
*H04L 9/06* (2006.01)
(Continued)

(52) U.S. Cl.
CPC ........ *H04L 63/0853* (2013.01); *H04L 9/0643* (2013.01); *H04W 8/183* (2013.01); *H04W 8/265* (2013.01); *H04W 12/06* (2013.01); *G06F 21/34* (2013.01); *G06F 21/44* (2013.01); *G06F 21/45* (2013.01); *H04W 4/50* (2018.02);
(Continued)

(58) Field of Classification Search
CPC ..... H04L 63/0853; H04L 63/08; H04L 63/04; H04L 63/0428; H04L 63/10; H04L 63/20; H04L 9/0643; H04L 9/32; H04L 9/3247; H04W 8/183; H04W 8/265; H04W 12/06; H04W 12/08; H04W 12/02; H04W 12/10;
(Continued)

(56) References Cited

U.S. PATENT DOCUMENTS

| 5,511,190 A | * | 4/1996 | Sharma ............... H04L 41/0895 |
| 7,707,632 B2 | * | 4/2010 | Nath ...................... H04W 12/37 726/25 |

(Continued)

FOREIGN PATENT DOCUMENTS

| CN | 1530790 A | * | 9/2004 | ............ G06F 21/121 |
| CN | 1530791 A | * | 9/2004 | ............. G06F 21/10 |

(Continued)

OTHER PUBLICATIONS

South Korean Patent Application No. 10-2020-0000809, Office Action mailed Jan. 23, 2021, 7 pages.
(Continued)

*Primary Examiner* — Eleni A Shiferaw
*Assistant Examiner* — Ali H. Cheema

(57) ABSTRACT

Techniques are described herein for authenticating a plurality of components of a user equipment to enable one or more functionalities of the components. The techniques include receiving a component identifier corresponding to a hardware component of the user equipment; verifying that the component identifier matches a network record in a data store, the network record corresponding to the hardware component; enabling one or more functionalities of the user equipment, based at least in part on verifying the component identifier with the network record; and activating the hardware component for use on the user equipment via a communications network.

15 Claims, 4 Drawing Sheets

(51) Int. Cl.
*H04W 8/18* (2009.01)
*H04W 8/26* (2009.01)
*H04W 12/06* (2021.01)
*G06F 21/34* (2013.01)
*G06F 21/44* (2013.01)
*G06F 21/45* (2013.01)
*H04W 4/50* (2018.01)
*H04W 12/108* (2021.01)
*H04W 12/126* (2021.01)
*H04W 12/40* (2021.01)

(52) U.S. Cl.
CPC ........ *H04W 12/108* (2021.01); *H04W 12/126* (2021.01); *H04W 12/40* (2021.01)

(58) Field of Classification Search
CPC ... H04W 12/37; H04W 12/037; H04W 16/18; G06Q 20/40; G06F 21/00
USPC .............................. 726/2, 26, 25; 713/2, 168
See application file for complete search history.

(56) References Cited

U.S. PATENT DOCUMENTS

| | | | |
|---|---|---|---|
| 7,769,394 B1 * | 8/2010 | Zhu | H04M 1/72457 455/456.6 |
| 9,716,708 B2 * | 7/2017 | Love | H04L 63/0823 |
| 10,536,340 B1 * | 1/2020 | Manning | H04W 12/10 713/168 |
| 10,549,347 B2 * | 2/2020 | Gold | B22F 7/06 |
| 2004/0025036 A1 * | 2/2004 | Balard | H04L 9/0822 713/176 |
| 2004/0034813 A1 * | 2/2004 | Chaboud | G06F 21/57 714/27 |
| 2004/0133792 A1 * | 7/2004 | Dublish | G06F 21/10 713/193 |
| 2007/0112906 A1 * | 5/2007 | Liu | H04L 67/02 709/200 |
| 2007/0124818 A1 * | 5/2007 | Bumiller | H04W 12/128 726/26 |
| 2008/0040619 A1 * | 2/2008 | Dublish | G06F 21/73 713/193 |
| 2008/0250408 A1 * | 10/2008 | Tsui | H02J 7/32 718/100 |
| 2009/0193162 A1 * | 7/2009 | Hamilton | H04W 12/06 713/168 |
| 2011/0010543 A1 * | 1/2011 | Schmidt | H04L 63/123 713/168 |
| 2011/0055917 A1 * | 3/2011 | Wickstrom | G06F 21/10 455/418 |
| 2011/0099361 A1 | 4/2011 | Shah et al. | |
| 2011/0200050 A1 * | 8/2011 | Ortacdag | H04L 49/3009 370/395.32 |
| 2011/0307711 A1 * | 12/2011 | Novak | H04W 12/48 455/411 |
| 2012/0290870 A1 * | 11/2012 | Shah | G06F 21/575 714/4.11 |
| 2012/0331526 A1 * | 12/2012 | Caudle | G06F 21/6209 726/4 |
| 2014/0066015 A1 * | 3/2014 | Aissi | H04L 63/0876 455/411 |
| 2014/0129815 A9 * | 5/2014 | Shah | H04W 12/108 713/2 |
| 2014/0129817 A1 * | 5/2014 | Novak | G06F 21/575 713/2 |
| 2014/0173071 A1 * | 6/2014 | Hazen | H04L 63/0876 709/223 |
| 2015/0081862 A1 * | 3/2015 | Archer | H04L 65/4025 709/223 |
| 2015/0105080 A1 * | 4/2015 | Jin | H04W 36/14 455/436 |
| 2015/0200934 A1 * | 7/2015 | Naguib | G06F 21/575 713/2 |
| 2015/0296364 A1 * | 10/2015 | Peruru | H04W 88/06 455/434 |
| 2016/0135048 A1 * | 5/2016 | Huxham | H04W 12/06 455/411 |
| 2016/0381134 A1 * | 12/2016 | Ljubuncic | H04L 63/123 714/E11.073 |
| 2017/0094691 A1 * | 3/2017 | Lin | H04W 76/10 |
| 2017/0118626 A1 * | 4/2017 | Sadhu | G06F 21/575 713/168 |
| 2017/0269965 A1 * | 9/2017 | Son | G06F 21/575 713/168 |
| 2017/0272950 A1 * | 9/2017 | Venkataramanachari | H04W 12/082 |
| 2018/0018663 A1 * | 1/2018 | Van | G07F 7/0873 |
| 2018/0173896 A1 * | 6/2018 | Arneson | G06Q 30/0251 |
| 2018/0204208 A1 * | 7/2018 | Davidson | G06Q 20/34 |
| 2018/0246732 A1 * | 8/2018 | Puri | H04L 63/123 714/E11.073 |
| 2018/0293372 A1 * | 10/2018 | Gold | G06F 16/955 |
| 2019/0166501 A1 * | 1/2019 | Debates | H04W 12/12 |
| 2019/0238558 A1 * | 8/2019 | Chaganti | G06F 11/2247 |
| 2019/0281558 A1 * | 9/2019 | Wu | H04L 63/102 |
| 2020/0044868 A1 * | 2/2020 | Vakulenko | G06F 21/305 |
| 2021/0264015 A1 * | 8/2021 | Akinaga | H04L 63/0807 |

FOREIGN PATENT DOCUMENTS

| | | | | |
|---|---|---|---|---|
| CN | 102396251 B | | 6/2015 | |
| CN | 103202045 B | | 6/2016 | |
| CN | 107222476 A | * | 9/2017 | ............. G06F 21/31 |
| CN | 107431924 B | | 6/2021 | |
| DE | 102017100886 A1 | * | 7/2017 | ............. G06F 21/57 |
| EP | 2070345 B1 | * | 11/2019 | ........ H04L 63/0853 |
| JP | 2004015495 | | 1/2004 | |
| JP | 2009020905 A | * | 1/2009 | ............. G06F 13/37 |
| JP | 4651947 B2 | * | 3/2011 | ............. G06F 21/10 |
| JP | 2019518642 A | * | 7/2019 | ............. G06F 21/57 |
| JP | 6625293 B2 | * | 12/2019 | ........... H04L 9/0643 |
| JP | 7021239 B2 | * | 2/2022 | ........... G06F 21/126 |
| KR | 20120018327 A | | 3/2012 | |
| KR | 20150026651 A | * | 3/2015 | ............. G06F 3/01 |
| KR | 20160013196 A | | 2/2016 | |
| RU | 2682858 C1 | * | 3/2019 | ........... B64C 39/024 |
| WO | 2010121020 A1 | | 10/2010 | |
| WO | 2012061678 A1 | | 5/2012 | |
| WO | 2014036021 A1 | | 3/2014 | |

OTHER PUBLICATIONS

European Patent Application No. 19217492.8, European Search Report mailed May 19, 2020, 7 pages.
South Korean Patent Application No. 10-2020-0000809, Final Office Action mailed Jul. 22, 2021, 5 pages.
Chinese Patent Application No. 201911394909.9, Office Action mailed Apr. 29, 2023, 9 pages.

* cited by examiner

HOLISTIC MODULE AUTHENTICATION WITH A DEVICE

BACKGROUND

With the rise of smartphone theft and loss, many consumers and businesses have expanded their efforts to lock or disable lost devices and render the devices unusable. This led to the creation of various anti-theft programs that combine different technologies to assist consumers if their device is stolen or lost. Typically, these programs will include remote device locking and tracking to locate stolen or lost devices and reporting to the proper authorities. However, these programs are often circumvented as most devices can be swiped, wiped, and resold. Additionally, phones can be fitted with a new subscriber identity module (SIM) card and used overseas or in certain geographical locations.

Anti-theft programs are also limited to deterring theft in limited circumstances. For instance, unactivated smartphones can be stolen or lost before delivery to consumers and stripped for spare high-value parts that can be sold as counterfeit goods. In the latter scenario, one or more hardware components from one device can be retrofitted to another device for use. Accordingly, there still exists an accessible marketplace where stolen or lost devices can be easily liquidated. In this regard, stolen and lost devices can have various impacts that can result in a loss of revenue, customer base, and business reputation for original equipment manufacturers (OEMs) and wireless telecommunication carriers.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
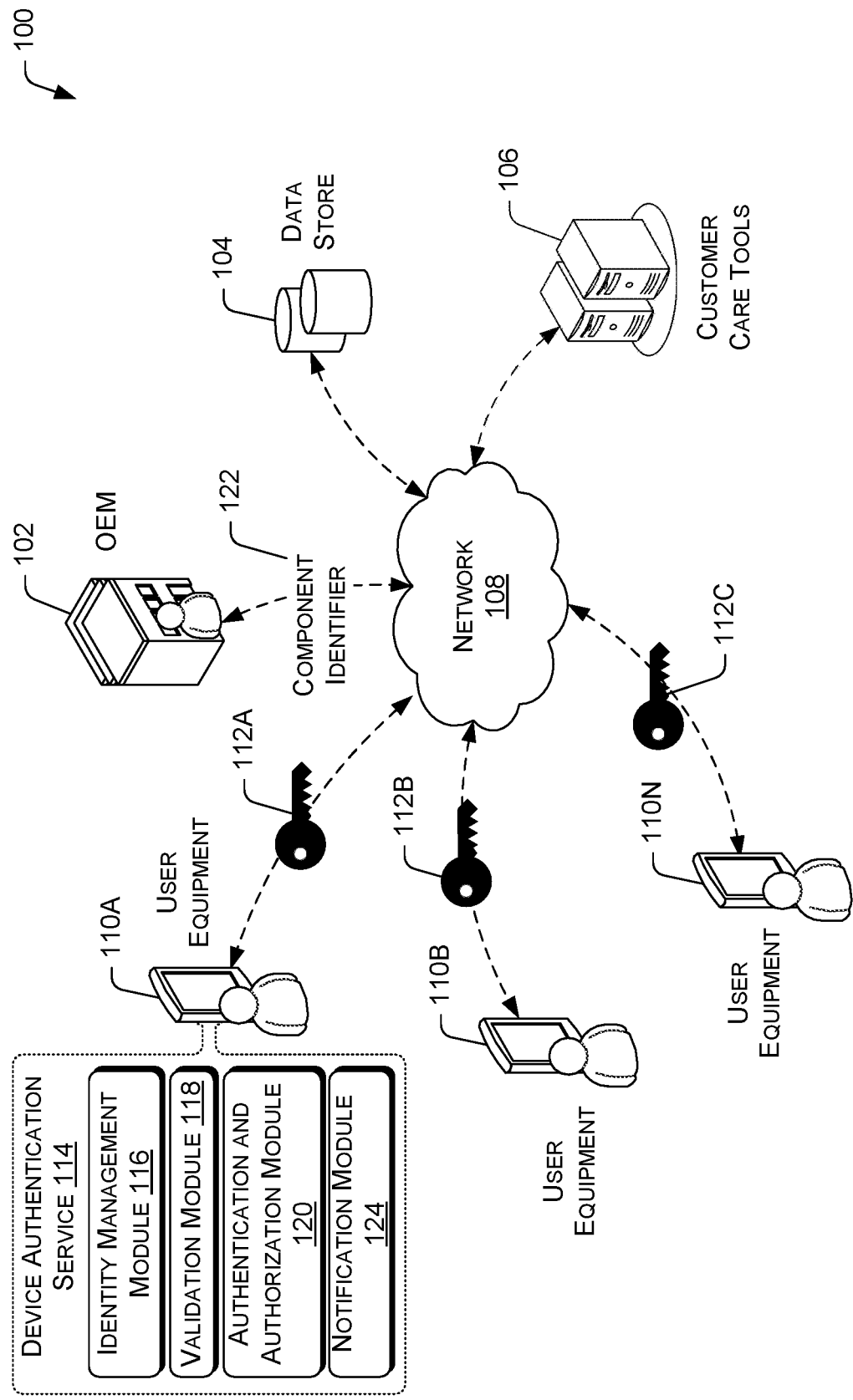
FIG. 1 illustrates an example network architecture for implementing a device-based authentication to identify and authorize the use of each of the hardware components of a user equipment.

This disclosure is directed to techniques for authenticating various hardware components of a user equipment. In various embodiments, the techniques described herein can be performed while a user equipment has booted up in recovery or during an initial setup such as device activation. During a boot sequence or setup, the user equipment can authenticate one or more of its hardware components via a device authentication service. The device authentication service can be stored and executed on the user equipment itself. As part of the setup or activation process, the device authentication service can obtain information associated with the hardware components, such as component identifiers and/or OEM information associated with the hardware components. In various embodiments, the information associated with the hardware components can be encrypted via an encryption key or hashed via a hash function. Thus, the component identifiers can be a protected or encrypted version of the component identifiers such that the actual component identifiers are not revealed during the authentication process.

Using this information, the device authentication service can provide information to a network data store, which can authenticate the component identifiers using various authentication protocols. The device authentication service can use the authenticated information to enable one or more functionalities of the hardware components corresponding to the component identifiers. Conversely, if the authentication is not successful, the device authentication service can use the unverified information to disable one or more functionalities of the hardware components corresponding to the component identifiers. In various embodiments, the user equipment may operate in a limited capacity or not at all. For example, if a camera component of the user equipment cannot be authenticated, the user equipment may operate without the camera component. In another example, if a battery component of the user equipment cannot be authenticated, the user equipment may not operate without the battery component.

In various embodiments, the device authentication service can authenticate one or more hardware components of the user equipment concurrently. Upon obtaining a plurality of component identifiers and/or OEM information associated with the hardware components, the device authentication service can consolidate the component identifiers and/or OEM information to generate a group component identifier that corresponds to the hardware components. The device authentication service can provide the group component identifier to the network data store, which can authenticate the group component identifier associated with the hardware components of the user equipment.

The device authentication service can use the verified information to enable one or more functionalities of the hardware components that correspond to the group component identifier. Because the group component identifier is unique to a set of hardware components of the user equipment, the group component identifier can change if one or more hardware components of the user equipment are swapped or updated. In this regard, a new group component identifier is generated using the component identifiers and/or OEM information of each of the hardware components for the second set of hardware components of the user equipment to generate a second group component identifier corresponding to the second set of hardware components of the user equipment.

In various embodiments, the device authentication service can transmit user equipment status to the network on a scheduled basis and/or in accordance with a notification scheme. For instance, the user equipment status can include the authentication status for each of the hardware components authenticated. The authentication process can be time-stamped such that the user equipment status can further include the dates and times of when the authentication was last conducted. The user equipment status can be used to continuously determine whether the hardware components of the user equipment are authenticated. If the user equipment status is not received for a predetermined period of time, one or more functions of the user equipment can be automatically disabled, or the user equipment can be locked.

The techniques described herein may be implemented in a number of ways. Example implementations are provided below with reference to the following figures.

Example Network Architecture

FIG. 1 illustrates an example architecture 100 for providing a device authentication service to ensure hardware integrity of a user equipment. The architecture 100 may include one or more user equipment 110A-110N such as smartphones, mobile devices, personal digital assistants (PDAs) or other electronic devices having a wireless communication function that is capable of receiving input, processing the input, and generating output data. Additionally, the user equipment 110A-110N can represent any type of consumer devices that can include computing devices and special purpose-type devices, embedded-type devices, Internet of Things (IoT) devices, wearable-type devices, wearable devices, gaming devices, or entertainment devices such as network-enabled televisions, set-top boxes, media players, cameras, automotive computers such as vehicle control systems, vehicle security systems, electronic keys for vehicles, medical devices, appliances, and/or so forth.

In various embodiments, the user equipment 110A-110N comprises one or more subscriber identity module (SIM) cards. In various embodiments, a SIM card can be a removable physical smart card or an embedded SIM card (i.e., eSIM, embedded UICC (eUICC)). The user equipment 110A-110N can be activated on a telecommunication network 108 operated by a telecommunications service provider utilizing one or more wireless base stations or any other common wireless or wireline network access technology.

The telecommunications network 108 can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet). The telecommunications network 108 can include one or more network elements (NEs), wherein the NEs can include a data store 104 and customer care tools 106. The data store 104, the customer care tools 106, and other NEs can comprise servers, which may include general-purpose computers, such as desktop computers, tablet computers, laptop computers, or other physical or virtual machines that are capable of receiving input, processing the input, and generating output data.

The data store 104 can comprise a database having a network record for the user equipment 110A-110N, which can include component identifiers 122 for one or more hardware components of the user equipment. Additionally, the record can include one or more telephone numbers corresponding to the user equipment 110A-110N, one or more users corresponding to each of the telephone numbers and a plurality of rules, policies, settings, privileges, credentials related to each of the users and/or user equipment 110A-110N, and/or so forth. In various embodiments, the data store 104 can also comprise an equipment identity register (EIR) or other device databases, such as a home subscriber server (HSS), a home location register (HLR), a user account database, and/or so forth.

The customer care tools 106 can comprise a chat program, a customer support wizard, and/or a customer service and a technical service program. The customer care tools 106 can provide a customer service user interface for interfacing with one or more user equipment 110A-110N. For example, the customer care tools 106 can include a customer chat application using various protocols, such as the Session Initiation Protocol (SIP), SIP Instant Messaging and Presence Leveraging Extensions (SIMPLE), Application Exchange (APEX), Instant Messaging and Presence Protocol (IMPP), Extensible Messaging and Presence Protocol (XMPP), or other messaging protocols. Additionally, the customer care tools 106 can provide Voice Over Internet Protocol (VoIP). The customer care tools 106 can route incoming calls or chat session messages from customers with service issues to customer support representatives of a telecommunications service provider. The customer care tools 106 can be made available during a boot sequence or setup, for example, in order to assist a subscriber with device authentication. The customer care tools 106 can be operated via the telecommunications service provider or a third-party entity working with the telecommunications service provider.

The architecture 100 further comprises at least one original equipment manufacturer (OEM) 102. The OEM 102 produces user equipment 110A-110N that contains one or more hardware components that require authentication prior to enabling the functionalities of the hardware components for authorized use. The OEM 102 can store component identifiers 122 that correspond to the hardware components that require authentication in a storage unit of the user equipment 110A-110N. For example, the component identifiers 122 can be stored in a reserved partition in non-volatile storage of the user equipment 110A-110N. Each of the component identifiers 122 are unique to each hardware component and the user equipment 110A-110N. The OEM can maintain an inventory of the component identifiers 122 and other device identifiers such as a serial number, an International Mobile Equipment Identifier (IMEI), and an embedded UICC identity (EID) corresponding to the eUICC of the user equipment 110A-110N. In various embodiments, the component identifiers 122 and the device identifiers can be managed in a device database. The user equipment 110A-110N provides a device authentication service 114. The device authentication service 114 includes an identity management module 116, a validation module 118, an authentication and authorization module 120, and a notification module 124.

One or more hardware components of the user equipment 110A-110N can include corresponding component identifiers 122, which are managed via the identity management module 116. Preferably, each hardware component comprises a unique component identifier 122. For example, a camera of the user equipment 110A-110N can comprise a first component identifier and a display screen of the user equipment 110A-110N can comprise a second component identifier, and so on. The component identifiers 122 for a plurality of hardware components of a user equipment 110A-110N can be grouped together to form a group identifier instead of individual component identifiers. The OEM 102 may assign component identifiers 122 to individual hardware components and/or a group identifier for a plurality of component identifiers 122. The component identifiers 122 can be physically printed on the hardware components. For example, the GSMA requires that the EID of an eUICC be printed on product packaging in a machine-readable form. Additionally, or alternatively, the hardware components can be programmed with identity data, depending upon embodiments. The identity data can be a set of pre-programmed binary numbers or any combination of alphanumeric characters that are used to identify the hardware component. In various embodiments, the component identifier 122 can comprise OEM information associated with the hardware component.

During a boot sequence or setup, the validation module 118 is configured to query one or more components of the user equipment 110A-110N for component identifiers 122. Upon receiving a component identifier 122, the validation module 118 can validate that the component identifier 122 corresponds to a hardware component of the user equipment 110A-110N. The validation module 118 can also validate that the component identifier 122 comprises legitimate data. For example, the validation module 118 can ensure that the component identifier 122 comprises a certain number of characters based on the type of hardware component corresponding thereto. Additionally, the validation module 118 can ensure that the component identifier 122 comprises certain types of characters that are associated with an OEM 102.

Upon validation, the authentication and authorization module 120 is configured to authenticate the hardware component corresponding to the component identifier 122 to enable the functionalities of the hardware component or authorize the use of the hardware component with the user equipment 110A-110N. In this regard, the authentication and authorization module 120 receives a validated component identifier 122 from the validation module 118 for authentication and authorization. The authentication and authorization module 120 determines that the component identifier 122 is associated with the correct type of hardware component. For example, the authentication and authorization module 120 can confirm that a first component identifier corresponds to a display screen, and a second component identifier corresponds to a battery.

The authentication and authorization module 120 can establish a connection to the data store 104, which can comprise a network record for the user equipment 110A-110N or credentials such as a component identifier 122 of a hardware component of the user equipment 110A-110N. The authentication and authorization module 120 can determine whether the component identifier received via the validation module 118 matches the component identifier in the record to enable the corresponding hardware component to function. In various embodiments, the authentication and authorization module 120 is configured to establish a connection to a network element on the telecommunications network 108 such as a remote authentication and authorization authority that contains authentication data (e.g., credentials) that can verify that the component identifier 122 is authentic and corresponds both to the hardware component and the user equipment 110A-110N. The authentication and authorization authority can be located on the telecommunications network 108 to allow for easy administrative changes such as adding credentials, removing credentials, updating credentials, and/or so forth.

Upon determining that the component identifier 122 is authenticated and authorized, the corresponding hardware component is enabled on the user equipment 110A-110N. Upon activation, the status (e.g., active, inactive, authenticated, not authenticated, etc.) of the hardware component and/or the user equipment 110A-110N is transmitted to the telecommunications network 108. In this regard, the device authentication service 114 can include a notification module 124 for transmitting status updates. Status updates can indicate whether one or more hardware components have been authenticated by the device authentication service 114 and activated for authorized use. The status update can also include the component identifier that corresponds to the hardware component of the user equipment associated with an account identifier of a subscriber account. For example, the status updates can comprise an integrated circuit card identity (ICCID) corresponding to a subscriber identity module (SIM) card of the user equipment. Additionally, or alternatively, the telecommunications service provider of the telecommunications network 108 can query the user equipment for status updates on a scheduled basis. The telecommunication service provider can also query the user equipment for a hash that corresponds to the hardware component of the user equipment associated with an account identifier of a subscriber account.

The component identifier 122 can be transformed into a protected or encrypted version of the component identifiers, namely encrypted component identifiers 112A-112N. In various embodiments, a cryptographic hash function can be used to generate a hash and protect the actual component identifiers 122. A cryptographic hash function is a mathematical algorithm that maps data of arbitrary size (i.e., the component identifier) to a bit string of a fixed size (i.e., hash). The hash function is designed to be a one-way function so the component identifiers cannot be reverse engineered. Examples of hash functions can include, without limitation, secure hash algorithm 2 (SHA-2), or SHA-3. It is contemplated that any hash function may be used any number of times in accordance with embodiments of the present disclosure. The hash can be automatically generated by the identity management module 116. Alternatively, the OEM may generate the hash based on the component identifier 122.

In various embodiments, the data store 104 comprises the hash digest of the component identifier. Upon receiving a component identifier 122 of a hardware component via the validation module 118, the authentication and authorization module 120 can run the same encryption or hash function on the component identifier 122, and the authentication and authorization module 120 can determine whether the result matches the stored hash digest in the data store 104. If the result matches the stored hash digest, the authentication and authorization module 120 can authenticate the hardware component corresponding to the hash or the component identifier and authorize the hardware component to operate with the user equipment 110A-110N. Additionally, the authentication and authorization module 120 can notify the telecommunications network of the user equipment status (e.g., authentication successful and device active, authentication failed and device inactive, etc.), depending upon embodiments.

Example Computing Device Components

Figure 2:
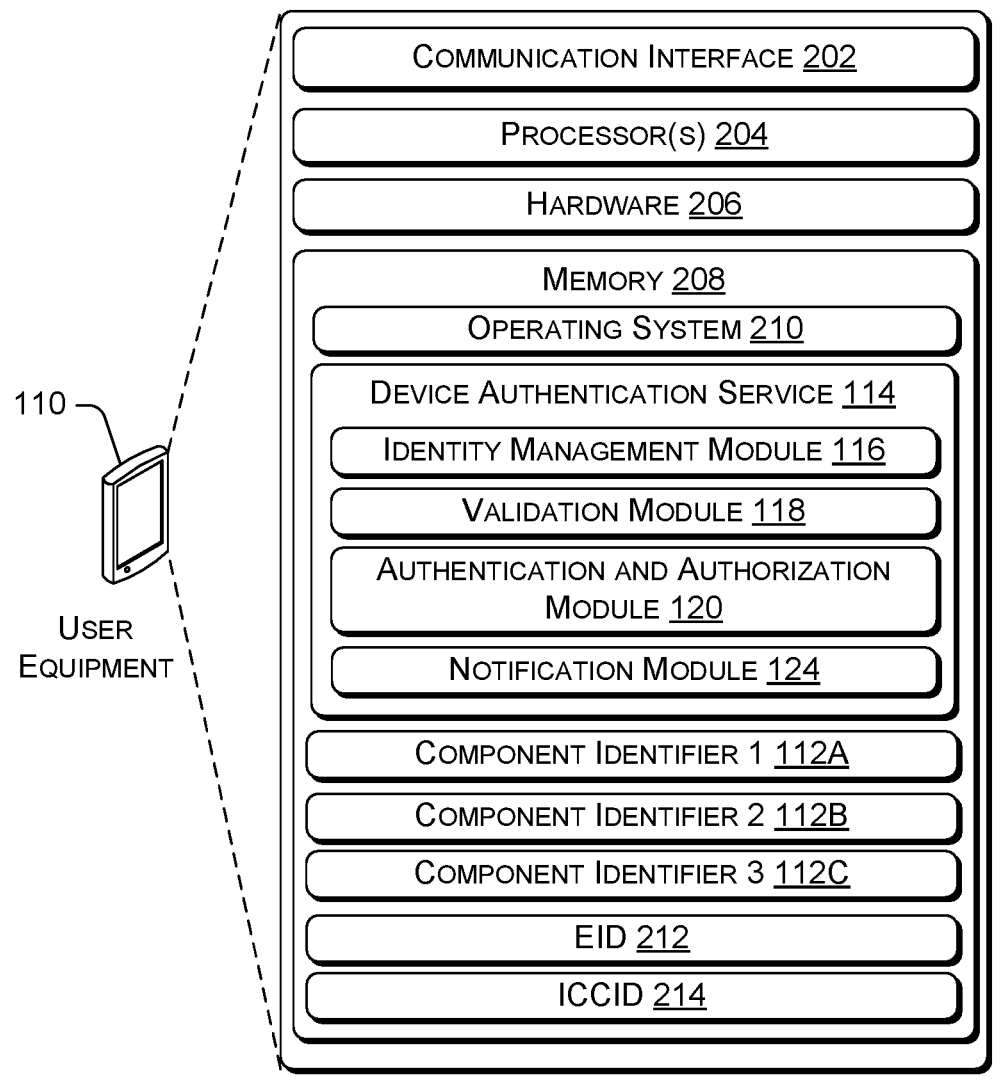
FIG. 2 is a block diagram showing various components of an illustrative computing device that implements the device-based authentication.

FIG. 2 is a block diagram showing various components of an illustrative computing device, wherein the computing device can comprise a user equipment 110. It is noted that the user equipment 110 as described herein can operate with more or fewer of the components shown herein. Additionally, the user equipment 110 as shown herein or portions thereof can serve as a representation of one or more of the computing devices of the present system.

The user equipment 110 may include a communication interface 202, one or more processors 204, hardware 206, and memory 208. The communication interface 202 may include wireless and/or wired communication components such as a modem and a SIM card (e.g., eSIM or eUICC) that enable the user equipment 110 to transmit data to and receive data from other networked devices. In at least one example, the one or more processor(s) 204 may be a central processing unit(s) (CPU), graphics processing unit(s) (GPU), both a CPU and GPU, or any other sort of processing unit(s) and/or controlling unit(s). Each of the one or more processor (s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 204 may also be responsible for executing all computer applications stored in the memory, which can be associated with common types of volatile (RAM) and/or nonvolatile (ROM) memory.

The user equipment 110 further comprises various hardware 206 for ensuring the integrity and security of personal data and enabling communications with telecommunications service providers. The hardware 206 may include additional user interface, data communication, or data storage hardware. Thus, the hardware 206 can include the communication interface 202 and the memory 208. The user interfaces may include a data output device (e.g., visual display, audio speakers), and one or more data input devices. The data input devices may include but are not limited to, combinations of one or more of keypads, keyboards, mouse devices, touch screens or display screens that accept gestures, microphones, voice or speech recognition devices, cameras, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In various embodiments, computer storage media can comprise secure persistent storage that can be a reserved partition in nonvolatile storage of the user equipment 110. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the user equipment 110.

The processors 204 and the memory 208 of the user equipment 110 may implement an operating system 210 and a device authentication service 114. The operating system 210 and the device authentication service 114 may reside, completely or at least partially, within the memory 208 and/or within the one or more processor(s) 204 during execution thereof by the user equipment 110. The operating system 210 may include components that enable the user equipment 110 to receive and transmit data via various interfaces (e.g., user controls, a communication interface, and/or memory input/output devices), as well as process data using the one or more processor(s) 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The device authentication service 114 includes an identity management module 116, a validation module 118, an authentication and authorization module 120, and a notification module 124. The identity management module 116 is configured to manage component identifiers 112A-112C for one or more hardware 206. The OEM can store component identifiers 112A-112C in the memory 208. In various embodiments, each of the hardware 206 can comprise a component identifier corresponding thereto. Alternatively, each of the hardware 206 within a set of hardware components can comprise a component identifier corresponding thereto. Preferably, the set of hardware components comprises high-value parts such as display screens, processors, batteries, and/or so forth. In various embodiments, the component identifiers 112A-112B can include EID 212 that corresponds to the eUICC of the user equipment 110. The eUICC contains one or more profiles. Profiles can include subscriber information associated with a network subscription. A profile can include a combination of a file structure, data, and applications associated with the service credentials provisioned onto the eUICC and which enable the user equipment 110 to use the subscription associated with that profile. Each profile is referred to as ICCID 214. Accordingly, component identifiers 112A-112B can be associated with ICCID 214.

The identity management module 116 can communicate with an OEM to receive identity data associated with component identifiers. In various embodiments, the identity management module 116 can implement a data management layer that includes software utilities for facilitating the acquisition, processing, storing, reporting, and analysis of data from multiple data sources such as the OEM, customer care tools, data store, network elements, and/or so forth.

The validation module 118 is configured to validate component identifiers. Validation can occur by determining that the component identifiers comprise a certain number of characters or certain types of characters. The validation module 118 can validate a single component identifier or a group component identifier that may represent a plurality of component identifiers. In the latter scenario, the validation module 118 can identify one or more invalid component identifiers of the plurality of component identifiers. If one or more component identifiers are invalid, the validation module 118 can indicate that the one or more component identifiers are invalid, and thus the group component identifier is invalid and terminate the authentication process.

Upon a successful validation, the validated component identifiers are provided to the authentication and authorization module 120. The authentication and authorization module 120 can authenticate one or more hardware components of the user equipment 110 to enable the functionalities of the hardware components or authorize the use of the hardware components with the user equipment 110. The authentication and authorization module 120 determines that the component identifier 122 corresponds to the correct hardware component. The component identifier 122 can be authenticated against a network record.

In this regard, the authentication and authorization module 120 is configured to establish a connection to a data store or a remote authentication and authorization authority that contains authentication data (e.g., credentials). Credentials for authenticating may include both data and instructions. For instance, credentials can include a stored hash digest of a component identifier or a component identifier corresponding to a hardware component, device data, and/or so forth. The credentials can be associated with a subscription for communications services from a telecommunications service provider. Multiple sets of credentials can be provided for multiple subscriptions. When the instructions are executed on the processor, the instructions may be configured to cause communications between the processor and the data store such that the user equipment 110, via the authentication and authorization module 120 can authenticate the component identifier and enable the functionalities of the hardware component corresponding to the component identifier for authorized use.

In various embodiments, the component identifier can be transformed into a hash via a cryptographic hash function. The identity management module 116 can automatically generate the hash. Additionally, or alternatively, the OEM may generate the hash based on the component identifier. The authentication and authorization module 120 can run a hash function on the component identifier, and the authentication and authorization module 120 may determine whether the result matches the stored hash digest of the component identifier. The stored hash digest of the component identifier can be stored in the data store. If the result matches the stored hash digest, the authentication and authorization module 120 can authenticate the hardware component corresponding to the component identifier and authorize the respective hardware component to operate with the user equipment 110.

Upon authenticating one or more hardware components, the notification module 124 transmits the status updates of the user equipment 110 to the network. The status updates can be transmitted on a scheduled basis. If the status updates are not transmitted for a predetermined period of time, one or more functionalities of the hardware components can be disabled. The status update can indicate which hardware component is authenticated and activated for authorized use. The authenticated components can be identified via its component identifier. Additionally, or alternatively, the telecommunications service provider of the network can query the user equipment for status updates on a scheduled basis. The telecommunications service provider can also query the user equipment for a hash that corresponds to the hash associated with the user equipment associated with an account that correlates with an account identifier. In various embodiments, the telecommunications service provider can transmit a query on a scheduled basis.

Example Processes

Figure 3:
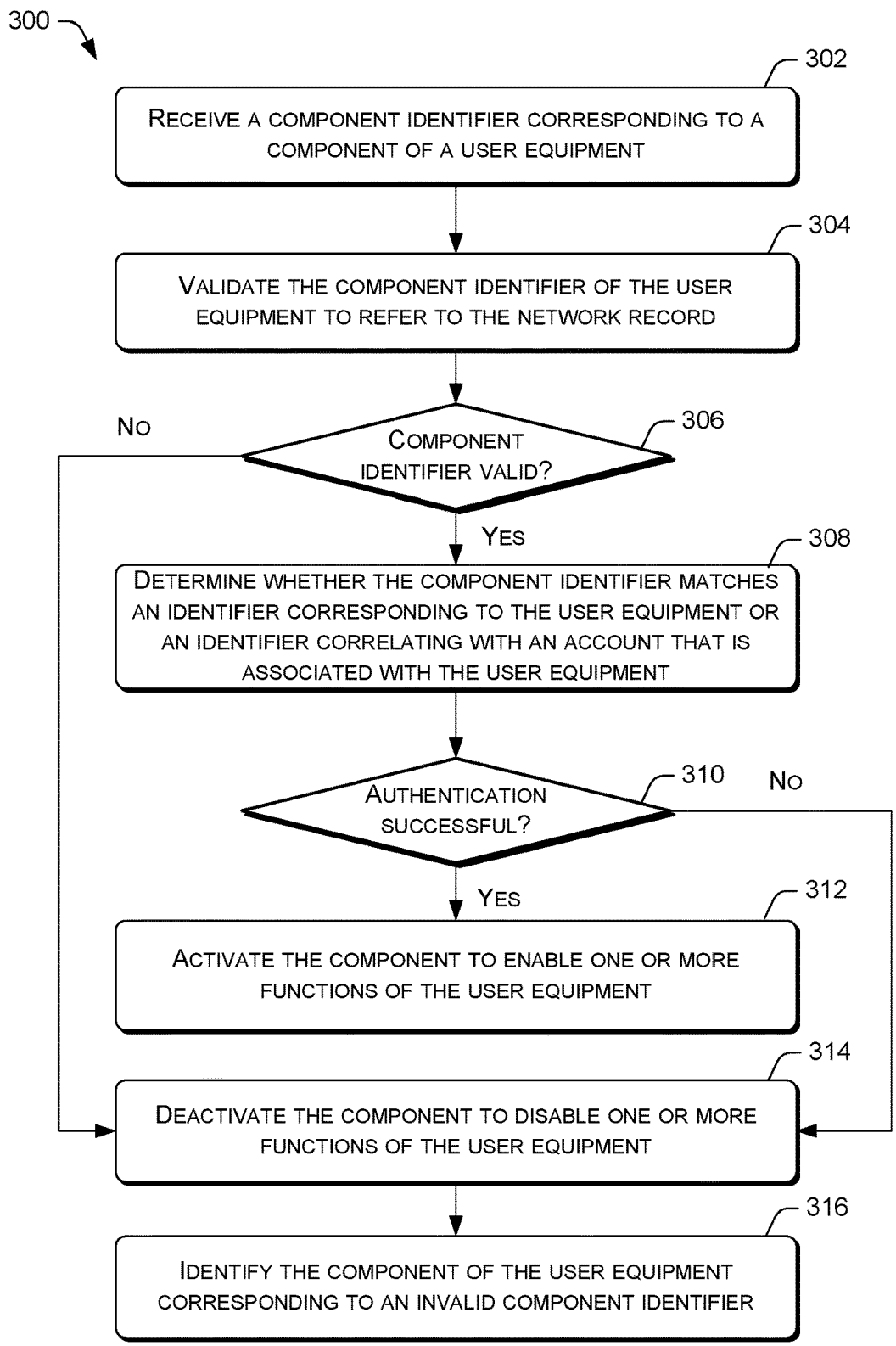
FIG. 3 is a flow diagram of an example process for conducting the device-based authentication using component identifiers for one or more hardware components of a user equipment.
Figure 4:
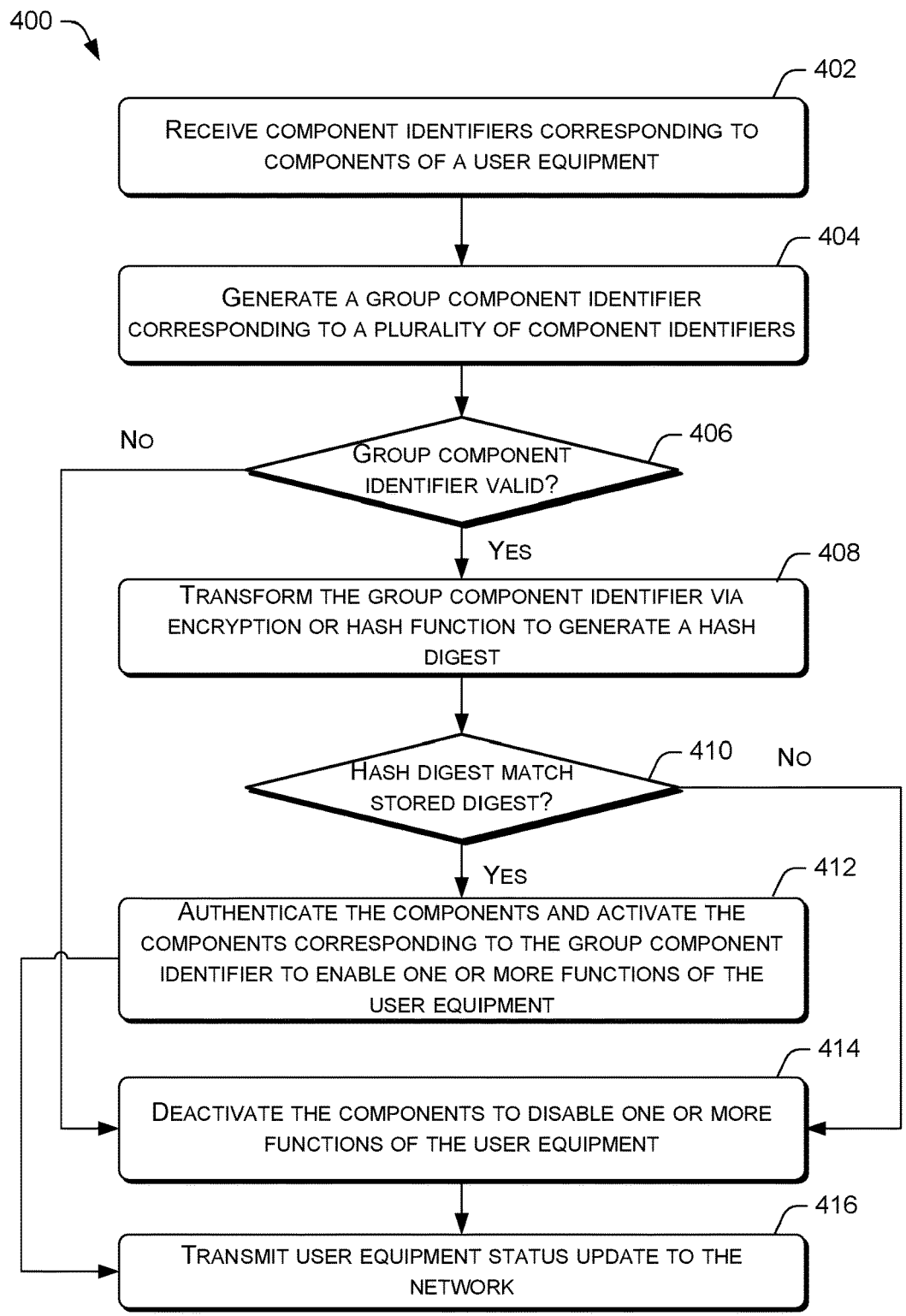
FIG. 4 is a flow diagram of an example process for conducting the device-based authentication using a group component identifier for a plurality of components for a user equipment.

FIGS. 3-4 present illustrative processes 300-400 for conducting the device-based authentication. The processes 300-400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are described with reference to the architecture 100 of FIG. 1.

FIG. 3 is a flow diagram of an example process 300 for conducting the device-based authentication, from the perspective of a user equipment. At block 302, a device authentication service, via a validation module, receives a component identifier of a hardware component of a user equipment upon, for example, a start of a boot sequence. The component identifier can be managed via an identity management module of the device authentication service. At block 304, the validation module of the device authentication service validates component identifier of the user equipment to refer to the network record. At decision block 406, the validation module determines whether the component identifier is valid. If the component identifier is valid ("yes" response from the decision block 306), the component identifier is provided to an authentication and authorization module of the device authentication service to determine whether the component identifier matches a set of identifiers corresponding to the user equipment or an identifier correlating with an account that is associated with the user equipment, as indicated in block 308. If the component identifier is encrypted, the authentication and authorization module runs the component identifier through a hash function and determines whether the result matches a stored hash digest of the component identifier.

If the component identifier is not valid ("no" response from the decision block 306), the validation module denies the authentication and deactivates the hardware component to disable one or more functions of the user equipment, as indicated in block 314. At decision block 310, the authentication and authorization module determines whether authentication is successful. If the authentication is successful ("yes" response from the decision block 310), the authentication and authorization module authorizes and activates the hardware component to enable one or more functions of the user equipment, as indicated in block 312. If the authentication is not successful ("no" response from the decision block 310), the authentication and authorization module denies the authentication and deactivates the hardware components to disable one or more functions of the user equipment. At block 316, the authentication and authorization module can identify the invalid component identifier corresponding to a component of the user equipment. In various embodiments, the authentication and authorization module can display the component that has not been authenticated.

Referring now to FIG. 4, there is shown an example process 400 for conducting the device-based authentication using a group component identifier for a plurality of hardware components for a user equipment. At block 402, the device authentication service, via the validation module, receives component identifiers corresponding to hardware components of a user equipment. At block 404, the identity management module generates a group component identifier corresponding to a plurality of component identifiers. Because the group component identifier is unique to a specific set of component identifiers, the group component identifier can change if one or more component identifiers change. At decision block 406, the validation module determines whether group component identifier is valid. A group component identifier is valid if all of the component identifiers that make up the group component identifier are valid. Additionally, or alternatively, a group component identifier is valid if all of the component identifiers that the group component identifier represents are valid. If the group component identifier is valid ("yes" response from the decision block 406), the group component identifier can be transformed via encryption or hash function to generate a hash digest, as indicated in block 408. In this regard, the group component identifier and/or the individual component identifiers can be protected.

If the group component identifier is not valid ("no" response from the decision block 406), the validation module denies the authentication and the components are deactivated to disable one or more functions of the equipment, as indicated in block 414. The group component identifier is not valid if one or more component identifiers that make up the group component identifier are not valid. Additionally, or alternatively, a group component identifier is valid if one or more of the component identifiers that the group component identifier represents are invalid. At decision block 410, the authentication and authorization module determines whether a hash digest of the group component identifier matches the stored hash digest of the group component identifier stored in the network data store. If the hash digest matches stored hash digest ("yes" response from the decision block 410), the authentication and authorization module authorizes the authentication and activates the components corresponding to the group component identifier to enable one or more functions of the user equipment, as indicated in block 412. If the hash digest does not match the stored hash digest ("no" response from the decision block 410), the authentication and authorization module denies the authentication and deactivates the components to disable one or more functions of the user equipment, as indicated in block 414.

At block 416, a notification module of the device authentication service transmits user equipment status updates to the network. For instance, the status updates can comprise identifying information pertaining to the user equipment, including a component identifier that corresponds to the components of the user equipment associated with an account that correlates with an account identifier. The status updates can indicate which hardware components of the user equipment are authenticated and activated for authorized use. The status updates can also indicate which hardware components of the user equipment are not authenticated. The status updates can be transmitted to the network on a scheduled basis such that the one or more functionalities of the user equipment can be disabled if status updates are not transmitted for a predetermined period of time.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors of user equipment to perform acts comprising:
receiving a set of component identifiers corresponding to an account identifier from a set of hardware components installed within the user equipment, wherein individual hardware components within the set of hardware components are associated with one or more different functionalities;
validating that one or more component identifiers of the set of component identifiers corresponds with a respective hardware component of the set of hardware components, wherein the validating is conditioned on each of the one or more component identifiers respectively corresponding with a hardware component type of the corresponding respective hardware component, and wherein the one or more component identifiers correspond to the account identifier of an account associated with the user equipment;
authenticating the hardware components based on the validated one or more component identifiers matching corresponding component identifiers of the set of hardware components stored in a data store, wherein the authenticating includes comparing a result of running a hash function on the validated one or more component identifiers to a stored hash digest of the corresponding component identifiers as stored in the data store;
determining that a hardware component of the set of hardware components is not authenticated when the component identifier of the hardware component does not match the corresponding component identifier for the hardware component in the data store; and
deactivating the hardware component when the hardware component is not authenticated, such that the user equipment is caused to operate absent one or more functionalities associated with the hardware component.

2. The one or more non-transitory computer-readable media of claim 1, wherein the component identifier includes an embedded UICC identity (EID) corresponding to an embedded UICC (eUICC) of the user equipment.

3. The one or more non-transitory computer-readable media of claim 1, wherein the data store comprises an equipment identity register (EIR).

4. The one or more non-transitory computer-readable media of claim 1, wherein the set of hardware components are identifiable via a group component identifier.

5. The one or more non-transitory computer-readable media of claim 1, wherein the component identifier comprises a serial number, the serial number comprising an International Mobile Equipment Identifier (IMEI) of the user equipment.

6. The one or more non-transitory computer-readable media of claim 1, wherein the acts further comprise determining that the hardware component of the set of hardware components is authenticated when the component identifier of the hardware component matches the corresponding component identifier for the hardware component in the data store.

7. A computer-implemented method for authenticating one or more hardware components of a user equipment, the method comprising:
accessing, via a device authentication service executed on the user equipment, component identifiers corresponding to a set of hardware components installed within the user equipment, wherein individual hardware components of the set of hardware components are associated with one or more different functionalities, and wherein the component identifiers correspond to an account identifier of an account associated with the user equipment;
generating, via the device authentication service, a group component identifier that identifies the set of hardware components installed in the user equipment from the component identifiers of the set of hardware components;
authenticating, via the device authentication service, the set of hardware components by:
validating the group component identifier by validating all of the component identifiers of the set of hardware components individually, wherein the group component is valid when all of the component identifiers are valid, and wherein the validating of the component identifiers is conditioned on each of the one or more component identifiers respectively corresponding with a hardware component type of the corresponding respective hardware component;

generating a hash digest of the validated group component identifier that identifies the set of hardware components installed within the user equipment; and verifying that the hash digest of the group component identifier matches a stored hash digest of a corresponding group component identifier for the set of hardware components stored in a data store;

activating, via the device authentication service, the set of hardware components based on a verified match of the hash digest of the group component identifier and the stored hash digest, such that the user equipment is caused to operate at least with the one or more different functionalities associated with the set of hardware components; and disabling the one or more different functionalities associated with the set of hardware components in response to a failure to receive, from a notification service of the user equipment for a predetermined time, a status update that indicates the set of hardware components are activated to a telecommunication service provider.

8. The computer-implemented method of claim 7, wherein the set of hardware components comprise a subscriber identity module (SIM) card and a corresponding component identifier of the SIM card comprises an integrated circuit card identity (ICCID).

9. The computer-implemented method of claim 7, wherein a component identifier of the component identifiers comprises original equipment manufacturer (OEM) information of a corresponding hardware component.

10. The computer-implemented method of claim 7, wherein the device authentication service is operable to configure the one or more hardware components based at least partially on the component identifiers.

11. The computer-implemented method of claim 7, wherein the status update comprises the respective component identifier corresponding to the one or more hardware components authenticated.

12. A system, comprising:
one or more non-transitory storage media configured to provide stored code segments, the one or more non-transitory storage media coupled to one or more processors, each configured to execute the code segments and causing the one or more processors to:
receive one or more component identifiers corresponding to one or more hardware components installed within a user equipment, each of the one or more component identifiers identifying a different hardware component of the user equipment, wherein the one or more component identifiers correspond to an account identifier of an account associated with the user equipment;

validate that the one or more component identifiers corresponds with a respective hardware component of the one or more hardware components, wherein the validating is conditioned on each of the one or more component identifiers respectively corresponding with a hardware component type of the corresponding hardware component;

authenticate the one or more hardware components based on the validated one or more component identifiers matching a corresponding component identifier, respectively, of the corresponding hardware component as stored in a data store, wherein authentication of the one or more hardware components includes comparing a result of running a hash function on the validated one or more component identifiers to a stored hash digest of the corresponding component identifiers as stored in the data store;

determine that a hardware component of the one or more hardware components is not authenticated when the component identifier of the hardware component does not match the corresponding component identifier for the hardware component in the data store; and deactivate the hardware component of the one or more hardware components when the hardware component is not authenticated, such that the user equipment is caused to operate absent one or more functionalities associated with the hardware component.

13. The system of claim 12, wherein authentication of the one or more hardware components includes accessing a network record that is stored in the data store via a network.

14. The system of claim 12, wherein the one or more processors are further caused to determine that the hardware component of the one or more hardware components is authenticated when the component identifier of the hardware component matches the corresponding component identifier for the hardware component in the data store.

15. The system of claim 14, wherein the one or more processors are further caused to communicate a status update indicating that the hardware component of the user equipment is authenticated to a telecommunications service provider.

* * * * *